W. S. BROWN.
STEAM ENGINE VALVE GEAR.
APPLICATION FILED JULY 11, 1911.
1,033,532.
Patented July 23, 1912.
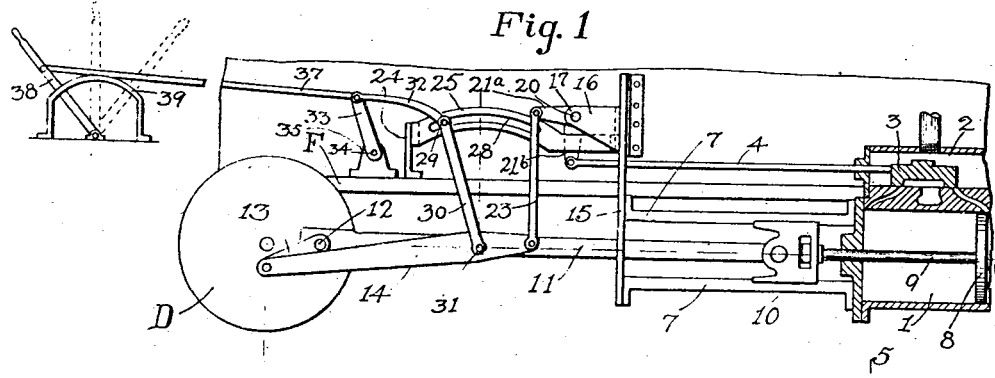
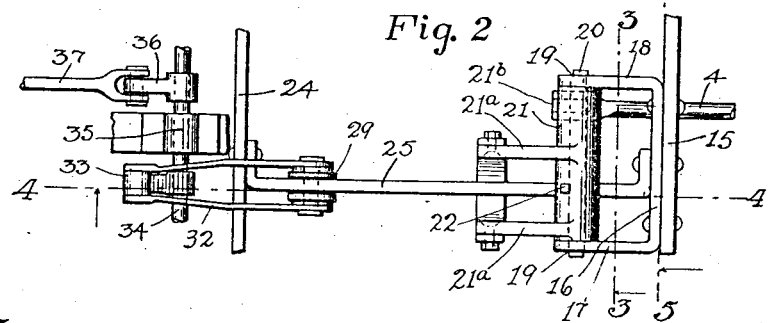
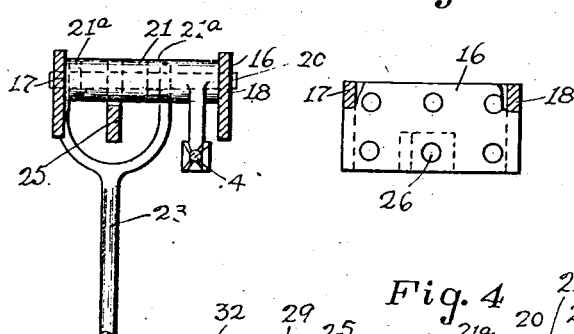
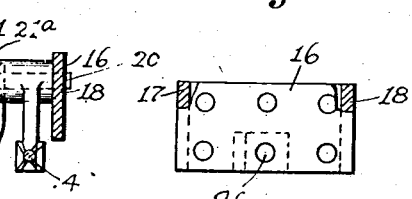
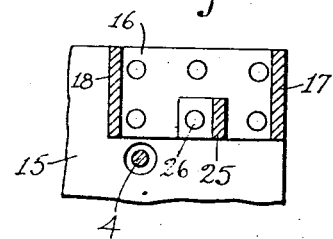
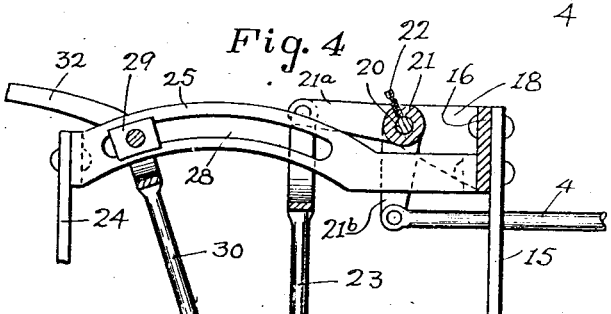
WITNESSES
Myrtle Kinzer
Roy V. Myers
INVENTOR
William S. Brown
By Cyrus Kehr
Attorney

UNITED STATES PATENT OFFICE.

WILLIAM SHERMAN BROWN, OF KNOXVILLE, TENNESSEE.

STEAM-ENGINE VALVE-GEAR.

1,033,532.     Specification of Letters Patent.    Patented July 23, 1912.

Application filed July 11, 1911. Serial No. 638,001

*To all whom it may concern:*

Be it known that I, WILLIAM SHERMAN BROWN, a citizen of the United States, residing at Knoxville, in the county of Knox and State of Tennessee, have invented a new and useful Improvement in Steam-Engine Valve-Gear, of which the following is a specification, reference being had to the accompanying drawing.

My improvement relates particularly to mechanism for transmitting motion from the crank of a drive wheel of a steam locomotive to the distributing valve which admits steam to the cylinder.

The object of my improvement is to provide a construction which is simple, has the parts accessibly located, and which avoids irregularity of valve action due to lost motion or "pounding" at the crank.

In the accompanying drawings, Figure 1 is a side elevation, portions being broken away, showing my improvement applied to one side of a locomotive; Fig. 2 is a plan of a portion of the mechanism shown by Fig. 1; Fig. 3 is a section on the line, 3—3, of Fig. 2, looking toward the right; Fig. 3ª is a section on the line, 3—3, of Fig. 2, looking toward the left; Fig. 4 is a section on the line, 4—4, of Fig. 2, looking in the direction of the arrow; Fig. 5 is a section on the line, 5—5, of Fig. 2, looking toward the right.

Referring to said drawings, 1, is the cylinder, 2, is the valve chest, 3, is the slide valve located within said chest, and 4, is the usual valve stem extending through said chest.

The ordinary piston, 8, is located within said cylinder, and has applied to it the ordinary piston rod, 9, which is joined to the ordinary cross-head, 10, confined between the usual horizontal parallel guide-bars, 7. To said cross-head is coupled one end of the usual connecting rod or pitman, 11, the other end of said rod being coupled to the usual main crank, 12, carried by a drive wheel, D. On the main crank, 12, is rigidly mounted an auxiliary crank, 13. To said auxiliary crank is coupled one end of the auxiliary pitman rod, 14. To the upper portion of the rear face of the ordinary guide-yoke, 15, is secured a U-shape bracket, 16, the body of which is placed flatwise against said face of said yoke. Two arms, 17 and 18, extend rearward from said body in planes which are upright and perpendicular to the plane of said yoke. In the upper portion of each arm is a bearing, 19, receiving the ends of a shaft, 20. On said shaft is a bell crank or rocking member, 21, preferably secured rigidly to said shaft by means of a set bolt, 22, so as to compel turning of said shaft in the bearings, 19. Said bell crank has two horizontal arms, 21ª, and a depending arm, 21ᵇ. The latter arm is coupled to the valve stem, 4. By rocking the bell crank, the valve stem is reciprocated.

An approximately upright link, 23, has its upper end coupled to the arms, 21ª, of the bell crank, while its lower end is coupled to the forward end of the auxiliary pitman rod, 14, both ends of said link being forked to receive said rod and said arms, as shown by the drawings.

A cross-beam or plate, 24, extends crosswise of the locomotive and is suitably secured to the framing, F. From said cross-beam, a bridge-piece, 25, extends forward to the bracket, 16. Said bridge-piece is in the form of a plate having its body set in an upright plane and having its rear end turned to a right angle and secured to the cross-beam, 24, of the engine frame, by bolts or rivets, 26, while its forward end is similarly turned to a right angle and secured to the bracket, 16, by similar bolts or rivets, 26. Said bridge-piece extends beneath the hub of the bell crank, 21.

In the body of the bridge-piece is a curved slot, 28, in which rests a slide block, 29, to which is coupled the upper end of an approximately upright link, 30. The lower end of said link is coupled to the auxiliary pitman rod, 14, by a bolt, 31. The slot, 28, is preferably made concentric with an axis which intersects a line which is an extension of the cylinder axis and cuts the axis of the drive-wheel, D; and the length of said link, 30, is such as to allow the axis of said bolt to become coincident with the axis to which said slot is concentric. An approximately horizontal link, 32, is coupled by its forward end to the slide block, 29, and by its rear end to the arm, 33, which is rigid on a rock shaft, 34, supported in bearings, 35. On said rock shaft is an arm, 36, to which is coupled a rod, 37, which is in turn coupled to the ordinary reversing lever, 38, working on a sector or quadrant, 39.

In operation, the slide block, 29, is set in any desired position in the slot, 28, by means of the reversing lever, and while said block is so set, the link, 30, oscillates on said block with each reciprocation of the auxiliary pitman rod, the axis of the bolt, 31, moving in an arc in which lies the axis to which the slot, 28, is concentric; and the distance between the wrist of the auxiliary crank, 13, and the bolt, 31, is such as to bring the axis of said bolt into the slot axis when the drive wheel is on either the front or the rear quarter. In Fig. 1, it is shown on the front quarter. During each such reciprocation, said pitman rod rocks bodily with the axis of the bolt, 31, as a fulcrum. This involves the rising and falling of the forward end of said auxiliary rod, and during such movement of said end of said rod, the link, 23, is forced up and down and such movement of said link causes the rocking of the bell crank, 21, and the reciprocation of the valve stem, 4. The gear is reversed by throwing the reversing lever across the center in the usual manner, and the opening of the valve is varied by moving the slide block nearer to or farther from the middle of the slot, 28, this being accomplished by the aid of suitable notches (not shown) on the reversing lever sector. When the slide block is on the middle of said slot, the valve motion is reduced to the extent of the "lead". The relation of the parts of the mechanism is such as to cause the desired quick movement of the valve during the opening and closing.

It is to be observed that my improvement eliminates from the valve mechanism the eccentric and also all parts having a high velocity. No part of the valve mechanism is connected to the connecting rod nor to the cross-head. Movement is transmitted to the valve stem from the wrist of the auxiliary crank and said wrist travels in a relatively small circle. Thus the movement of the auxiliary rod and the links, 23, and 30, are through relatively short ranges. Furthermore it is to be noted that lost motion due to wear at the wrist of the auxiliary crank will chiefly modify the lengthwise movement of the auxiliary pitman, 14, while the movement transmitted through the link, 23, is approximately at right angles to said auxiliary pitman. Hence the modification of the longitudinal movement of said pitman is substantially not transmitted to said link. And it will be seen that such modification of the rocking movement of the auxiliary pitman due to wear at the wrist of the auxilary crank will affect the link, 23, in minimized form, because the portion of the auxiliary pitman between the axis, 31, and the link, 23, is much less than between said axis and the wrist of the auxiliary crank. In this connection it is to be remembered that wear by the auxiliary crank wrist in the auxiliary pitman is chiefly in the direction of the length of said pitman. Such wear produces what is termed lost motion or "pounding" at the crank.

I claim as my invention,

1. In a steam engine valve gear, the combination of a slide block, means for moving said block, an auxiliary crank, an auxiliary rod coupled to said crank, and two approximately upright links, each having its lower end coupled to the auxiliary rod and one having its upper end coupled to said slide block and the other having its upper end in operative relation with the distributing valve, substantially as described.

2. In a steam engine valve gear, the combination of a slide block, means for moving said block, a bell crank in operative relation with the distributing valve, an auxiliary crank, an auxiliary rod coupled to said crank, and two approximately upright links each having its lower end coupled to the auxiliary rod and one having its upper end coupled to said slide block and the other having its upper end coupled to said bell crank, substantially as described.

3. In a steam engine valve gear, the combination of an approximately horizontal bridge-piece forming a slideway, a slide block on said slideway, means for moving said block, an auxiliary crank, an auxiliary rod coupled to said crank, and two approximately upright links, each having its lower end coupled to the auxiliary rod and one having its upper end coupled to said slide block and the other having its upper end in operative relation with the distributing valve, substantially as described.

4. In a steam engine valve gear, the combination of an approximately horizontal bridge-piece forming a slideway, a slide block on said slideway, means for moving said slide block, a bell crank in operative relation with the distributing valve, an auxiliary crank, an auxiliary rod coupled to said crank, and two approximately upright links each having its lower end coupled to the auxiliary rod and one having its upper end coupled to the slide block and the other having its upper end coupled to the bell crank, substantially as described.

5. In a steam engine valve gear, the combination of a bracket, a bell crank hinged to said bracket and being in operative relation with the distributing valve, a slide block, means for supporting said slide block, means for moving said slide block, an auxiliary crank, an auxiliary rod, and two approximately upright links each having its lower end coupled to said auxiliary rod and one having its upper end coupled to said slide block and the other having its upper end coupled to said bell crank, substantially as described.

6. In a steam engine valve gear, the combination of a bracket, a bell crank supported by said bracket and being in operative relation with the distributing valve, a bridge-piece having its rear end secured to the engine framing and having its other end extended beneath said bell crank and secured to said bracket, the said bridge-piece having a slideway, a slide block on said slideway, means for moving said block, an auxiliary crank, an auxiliary rod coupled to said crank, and two approximately upright links each having its lower end coupled to the auxiliary rod and one having its upper end coupled to said slide block and the other having its upper end coupled to said bell crank, substantially as described.

In testimony whereof I have signed my name, in presence of two witnesses, this 20th day of June, in the year one thousand nine hundred and eleven.

WILLIAM SHERMAN BROWN.

Witnesses:
CYRUS KEHR,
B. C. OGLE.